United States Patent  
Carbone et al.

(10) Patent No.: US 8,010,947 B2
(45) Date of Patent: Aug. 30, 2011

(54) DISCOVERING MULTI-COMPONENT SOFTWARE PRODUCTS BASED ON WEIGHTED SCORES

(75) Inventors: Giancarlo Carbone, Rome (IT); Fabio Cerri, Rome (IT); Bernardo Pastorelli, L'Aquila (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/752,473

(22) Filed: May 23, 2007

(65) Prior Publication Data

US 2008/0235664 A1 Sep. 25, 2008

(30) Foreign Application Priority Data

May 23, 2006 (EP) .................................... 06114395

(51) Int. Cl.
*G06F 9/44* (2006.01)
(52) U.S. Cl. ........................................ 717/121; 717/120
(58) Field of Classification Search ........... 717/120–123
See application file for complete search history.

(56) References Cited

U.S. PATENT DOCUMENTS

| | | | |
|---|---|---|---|
| 5,590,056 | A | 12/1996 | Barritz |
| 5,845,065 | A | 12/1998 | Conte et al. |
| 5,970,143 | A | 10/1999 | Schneier et al. |
| 6,202,924 | B1 | 3/2001 | Saunders |
| 6,209,093 | B1 | 3/2001 | Venkatesan et al. |
| 6,898,555 | B2 | 5/2005 | Levi et al. |
| 6,920,567 | B1 | 7/2005 | Doherty et al. |
| 7,089,552 | B2 | 8/2006 | Atallah |
| 7,174,540 | B2 * | 2/2007 | Ondrusek et al. ............. 717/120 |
| 7,236,610 | B1 | 6/2007 | Luo et al. |
| 7,236,958 | B2 | 6/2007 | Wong et al. |

(Continued)

FOREIGN PATENT DOCUMENTS

WO WO 96/18939 6/1996

OTHER PUBLICATIONS

U.S. Appl. No. 11/168,693, Image File Wrapper printed Apr. 6, 2011, 3 pages.
"InterLok for Windows User Guide", PACE Anti-Piracy, Inc., Feb. 2001, http://www.paccap.com/docs/InterLok_for_windows.pdf, 132 pages.

*Primary Examiner* — Anna Deng
*Assistant Examiner* — Qing Chen
(74) *Attorney, Agent, or Firm* — Stephen J. Walder, Jr.; Jeffrey S. LaBaw (57) ABSTRACT

A solution for discovering shared software components ($C_1$-$C_9$) of software products ($PROD_a$-$PROD_e$) installed on a data processing system is proposed. In order to achieve this result, for each software product the corresponding software components are aggregated into groups ($G_{a1}$-$G_{e1}$); each group includes software components that must be linked by a corresponding relationship (such as a co-location on the same operating system image). In this way, it is possible to assign a software component available on the system to its software product even when it may be used by more of them. Particularly, the operation is performed deterministically when the available software component is included in a single valid group (i.e., a group including all the required software components); in this case, the available software component ($C_2$) is assigned to the software product ($PROD_b$) associated with the single valid group ($G_{b1}$). Alternatively, when an (ambiguous) available software component ($C_4, C_8, C_9$) is included in more valid groups, a score is calculated for each associated (eligible) software product according to the corresponding available software components; the eligible software product with the highest score ($PROD_c$) is then selected for assigning the ambiguous software component.

20 Claims, 5 Drawing Sheets

U.S. PATENT DOCUMENTS

| | | | |
|---|---|---|---|
| 7,434,202 B2 * | 10/2008 | Kramer | 717/120 |
| 7,529,775 B2 | 5/2009 | Bluvshteyn et al. | |
| 7,617,224 B2 * | 11/2009 | Moulckers et al. | 1/1 |
| 7,617,483 B2 * | 11/2009 | Vigelius et al. | 717/121 |
| 7,627,855 B2 * | 12/2009 | Inoue et al. | 717/120 |
| 7,676,792 B2 * | 3/2010 | Irie et al. | 717/121 |
| 7,860,239 B2 | 12/2010 | Cerri et al. | |
| 2002/0022971 A1 | 2/2002 | Tanaka et al. | |
| 2002/0083003 A1 | 6/2002 | Halliday et al. | |
| 2002/0107701 A1 | 8/2002 | Batty et al. | |
| 2002/0194578 A1 * | 12/2002 | Irie et al. | 717/122 |
| 2003/0120923 A1 | 6/2003 | Gilman et al. | |
| 2003/0135474 A1 | 7/2003 | Circenis et al. | |
| 2003/0154168 A1 | 8/2003 | Lautenbacher | |
| 2004/0162989 A1 | 8/2004 | Kirovski | |
| 2004/0168152 A1 * | 8/2004 | Kramer | 717/120 |
| 2004/0243807 A1 | 12/2004 | Hughes et al. | |
| 2004/0255272 A1 * | 12/2004 | Ondrusek et al. | 717/120 |
| 2004/0268313 A1 | 12/2004 | Teglia et al. | |
| 2005/0091535 A1 | 4/2005 | Kavalam et al. | |
| 2005/0120333 A1 * | 6/2005 | Inoue et al. | 717/120 |
| 2005/0278791 A1 | 12/2005 | Chu et al. | |
| 2006/0026105 A1 | 2/2006 | Endoh | |
| 2006/0037001 A1 * | 2/2006 | Irie et al. | 717/120 |
| 2006/0059366 A1 | 3/2006 | Feinleib et al. | |
| 2006/0136935 A1 * | 6/2006 | Vigelius et al. | 719/328 |
| 2006/0155830 A1 * | 7/2006 | Dettinger et al. | 709/220 |
| 2007/0192340 A1 * | 8/2007 | Moulckers et al. | 707/100 |

* cited by examiner

FIG.4

DISCOVERING MULTI-COMPONENT SOFTWARE PRODUCTS BASED ON WEIGHTED SCORES

FIELD OF THE INVENTION

The present invention relates to the information technology field. More specifically, the invention relates to the discovering of software components in a data processing system.

BACKGROUND ART

Thorough knowledge of data processing systems is of the utmost importance in a number of resource management applications. A typical example consists of the identification of software products that are installed on a system; typically, this information is used to meter the usage of the software products, such as by a license management application (for example, for charge-back accounting).

For this purpose, inventory tools are exploited to discover the required information. A commercial inventory tool available on the market is the "IBM Tivoli Common Inventory Technology or CIT" by IBM Corporation; in the example at issue, the inventory tool is part of a commercial license management application, such as the "IBM Tivoli License Compliance Manager or ITLCM" by IBM Corporation.

In this scenario, a problem arises when the software products include multiple software components cooperating among them. Generally, these software components may be installed independently; moreover, the same software components may belong to two or more different software products. A typical case is that of utilities that can be used in more complex applications; for example, the inventory tool itself may be exploited—in addition to the above-mentioned license management applications—in software distribution applications, in monitoring applications, and the like.

The inventory tools known in the art can only determine the software components that are installed on the system. However, it is quite difficult (if not impossible) to determine the software product owning each software component. Indeed, once a software component is installed on the system, it generally does not include any information about the corresponding software product (because of either a deliberate design choice or an intrinsic limitation of the software component).

Therefore, if the software component may be shared by multiple software products it is not possible to determine the one among them that actually includes the software component. This may even prevent the identification of software products that are installed on the system.

This problem is particular acute when different conditions of use apply to specific exploitation of the same software component. Indeed, the conditions of use of the software component typically depend on the software product that embeds it; for example, the usage of the software component is generally subjected to licensing fees increasing with the complexity of the environment wherein it is used (while it may be free of charge in specific contexts).

All of the above may impair the correct operation of the inventory tool (and more generally of any application based thereon). Particularly, in the software licensing scenario it is not possible to associate the correct charging rate to the usage of the software components. This involves the risk of having a wrong license management of the system, which may result in inaccurate charge-back.

SUMMARY OF THE INVENTION

In general, the present invention provides a method, system and computer product for discovering software components belonging to software products in a data processing system where at least one of the software components may belong to a plurality of software products. The invention associates each software product with the definition of at least one group of software components based on a relationship among the software components of the group. The invention detects the software components available in the system being included in each group. Next, the groups which are valid according to the inclusion of the software components of the corresponding definition are identified. Next, each available software component is assigned to at least one of the software products which has at least one associated valid group including the available software component.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1A:
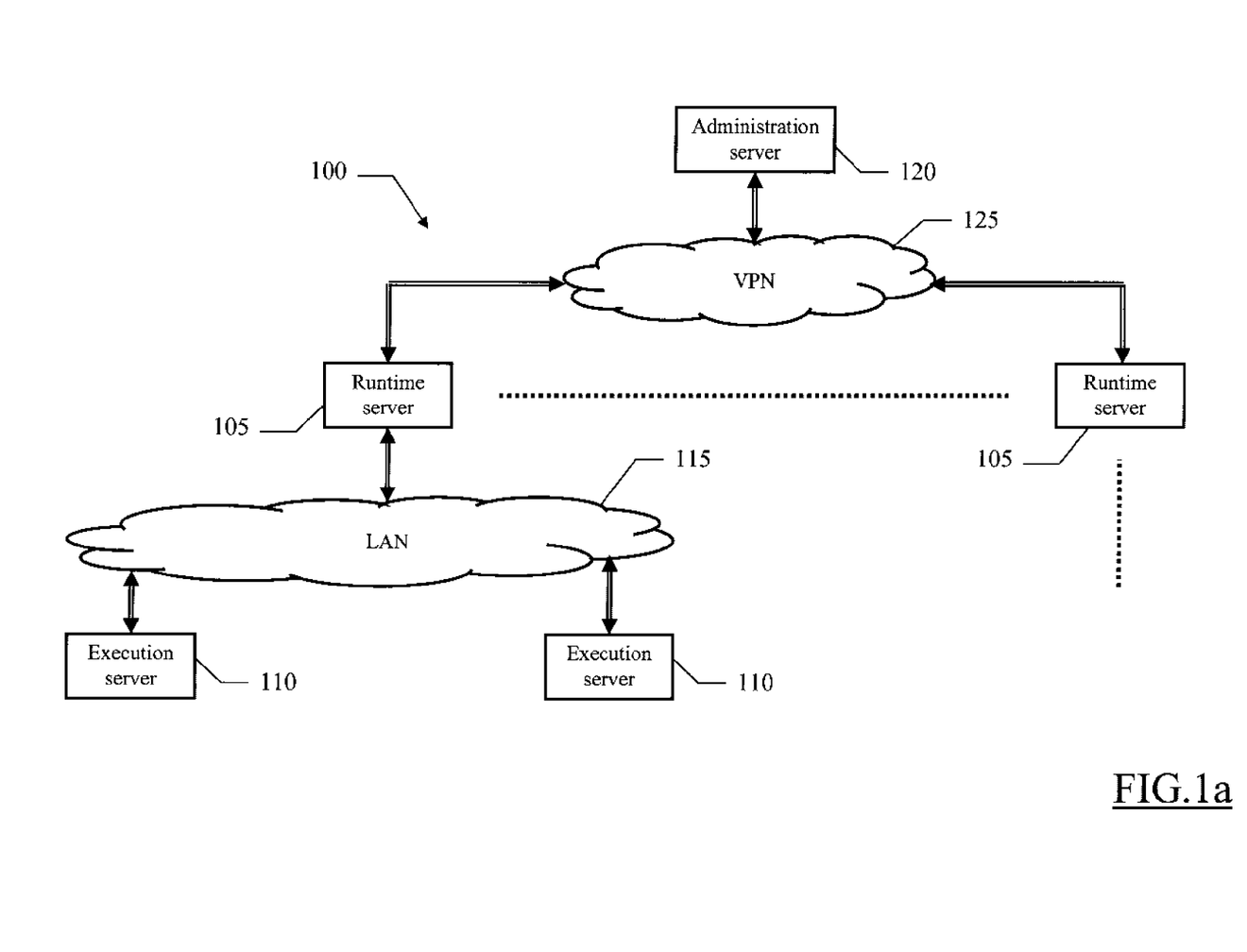
FIG. 1a is a schematic block diagram of a data processing system in which the solution according to an embodiment of the invention is applicable.

With reference in particular to FIG. 1a, a data processing system 100 with distributed architecture is depicted. The system 100 implements a license management infrastructure (for example, based on the above-mentioned "ITLCM"), which allows metering the usage of selected software products.

The system 100 includes one or more independent organizations (only one shown in the figure), which are completely separate and distinct from each other. Within the organization, different divisions are defined. Each division is controlled by a runtime server 105, which collects information about the usage of assigned software products on a set of corresponding execution servers 110; for this purpose, the runtime server 105 and all the execution servers 110 of the division communicate through a network 115 (for example, a LAN). The different runtime servers 105 report to a single administration server 120, which implements a central control point of the usage information collected in the whole organization by the runtime servers 105; the runtime servers 105 and the administration server 120 are connected to a different network 125 (for example, a Virtual Private Network or VPN based on the Internet).

Figure 1B:
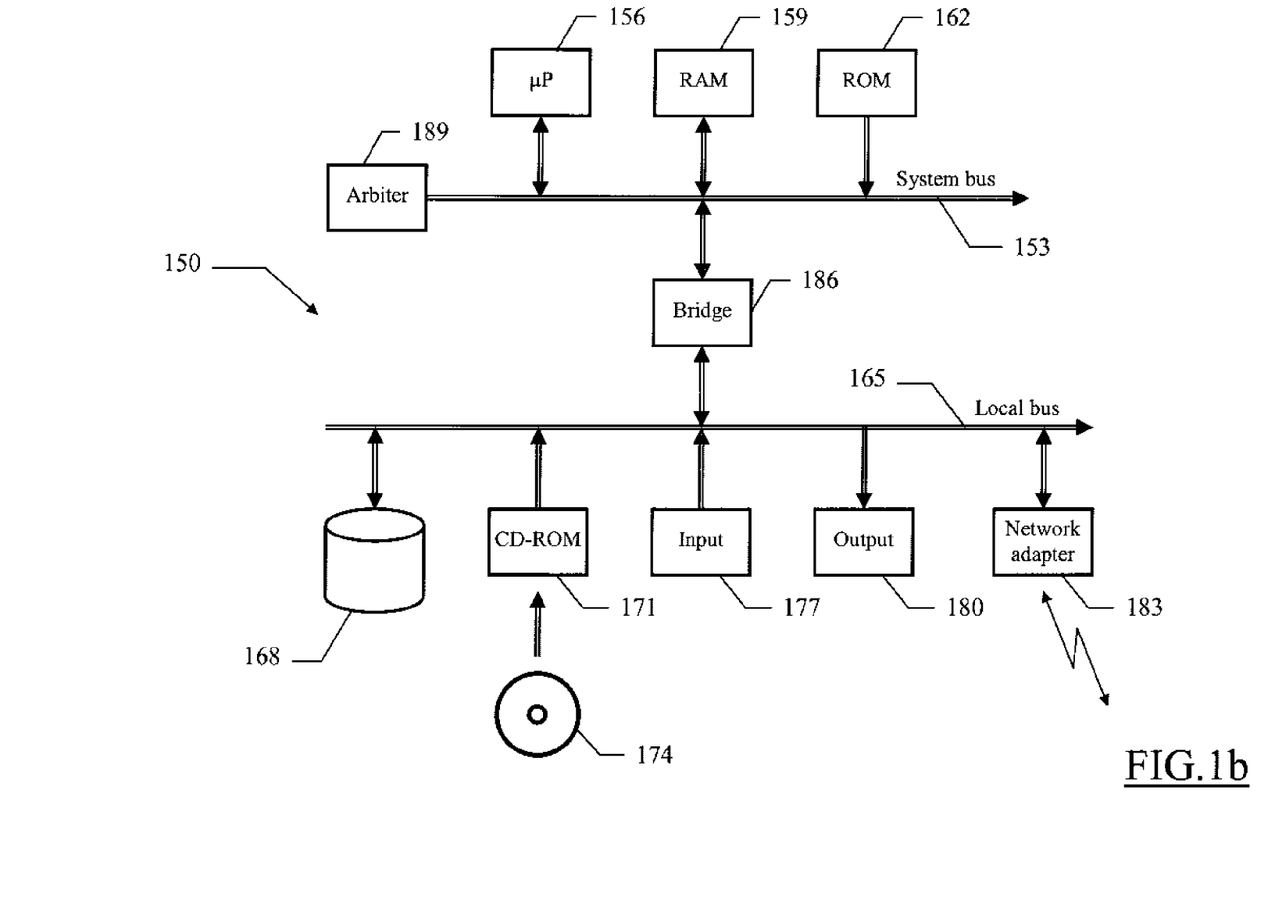
FIG. 1b shows the functional blocks of an exemplary computer of the system.

Considering now FIG. 1b, a generic computer of the above-described system (runtime server, execution server or administration server) is denoted with 150. The computer 150 is formed by several units that are connected in parallel to a system bus 153 (with a structure that is suitably scaled according to the actual function of the computer 150 in the system). In detail, one or more microprocessors (mP) 156 control operation of the computer 150; a RAM 159 is directly used as a working memory by the microprocessors 156, and a ROM 162 stores basic code for a bootstrap of the computer 150. Several peripheral units are clustered around a local bus 165 (by means of respective interfaces). Particularly, a mass storage consists of one or more hard-disks 168 and drives 171 for reading CD-ROMs 174. Moreover, the computer 150 includes input units 177 (for example, a keyboard and a mouse), and output units 180 (for example, a monitor and a printer). A network adapter 183 is used to plug the computer 150 into the system. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
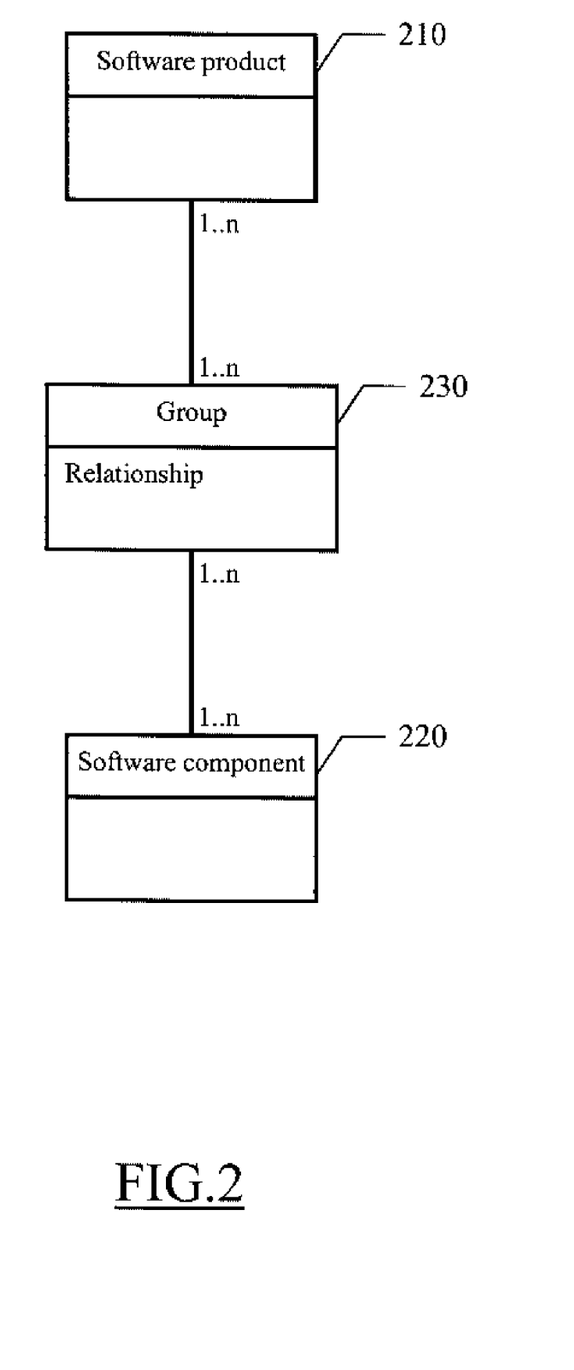
FIG. 2 is a class diagram modeling an implementation of the solution according to an embodiment of the invention.

Moving to FIG. 2, each software product (class 210) typically includes one or more software components (class 220). Each software component 220 is defined as exclusive when it may only belong to a single software product 210; examples of exclusive software components 220 are the "IBM Tivoli Configuration Manager (ITCM)" and the "Software Installation Engine (SIE)" of the "IBM Tivoli Software Distribution" by IBM Corporation, or the "Composer" and the "Master Domain Manager" of the "IBM Tivoli Workload Scheduler (TWS)" by IBM Corporation. Conversely, each software component 220 is defined as shared when it may belong to multiple software products 210; examples of shared software components 220 are the above mentioned "CIT" or the "IBM DB2 Server" by IBM Corporation (which may be included, for example, in the "DB2 UDB Enterprise Server (ESE)" or in the "IBM WebSphere Application Server (WAS)" by IBM Corporation).

The software components 220 are used to identify the software products 210 that are available on each execution server, so as to assign each software component 220 to the correct software product 210. For this purpose, as described in detail in the following, in the solution according to an embodiment of the present invention the software components are aggregated into one or more groups 230. Each group 230 includes (exclusive or shared) software components 220, which must be linked by a corresponding relationship. The relationship represents some sort of interaction among the software components 220 of the group 230 (with the corresponding condition that is always fulfilled in a degenerated group 230 formed by a single software component 220); in other words, the presence of the software components 220 in a group 230 indicates that these software components 230 interact to each other, and then it is likely that they belong to the corresponding software product 210. This information is statically defined, and it is typically readily available when the software product 210 is built. Each group 230 must include one or more software components 220 that are required for its definition; preferably, some of the groups 230 may also include software components 220 that are only optional (i.e., they are not necessary for the definition of the groups 230 and may also be missing).

In order to identify the available software products 210, for each required software component 220 available on the execution server the corresponding groups 230 that may include it are determined. Each group 230 for which all the required software components 220 are available is considered valid. When an available software component 220 is included in a single valid group 230, the available software component 220 is assigned to this valid group 230. Each group 230 is then considered available on the execution server when all its required software components 220 are assigned thereto. Each software product 210 can now be identified (as available on the execution server) when one or more of its groups 230 are available.

In this way, for each available software component—or at least for some of them—it is possible to identify the correct software product owning it (even when the available software component might be owned by more software products). As a consequence, it is possible to determine the software products that are actually available.

This advantage is clearly perceived in the software licensing applications (especially when different conditions of use apply to specific exploitation of the same software component); indeed, the proposed solution allows associating the correct charging rate to the usage of the software component (for example, by increasing it with the complexity of the software products wherein it is included).

All of the above substantially improves the reliability of the process of discovering the software components/products that are available (and then of any application based on this discovering process). Particularly, in the software licensing scenario this prevents the risk of having a wrong license management of the system, which may result in inaccurate charge-back.

Different relationships may be used to define the groups 230. For example, in an embodiment of the invention the relationships consist of a co-location in a common logical environment (typically defined by an operating system image); in this case, the software components 220 are considered included in the corresponding group 230 when they are installed on the same operating system image. The proposed choice reflects the location properties of the software products 210 (which software components 220 must generally be available in the same environment).

Alternatively, the relationships consist of an intercommunication of the software components 220; in this case, the software components 220 are considered included in the corresponding group 230 when they communicate to each other (either locally by means of message pipes or remotely by means of network protocols). The proposed choice reflects the communication properties of the software products 210 (which software components 220 must generally exchange information).

In a different embodiment of the invention, the relationships consist of an invocation dependency of the software components 220; in this case, the software components 220 are considered included in the corresponding group 230 when they launch or are launched by the others. The proposed choice reflects the inter-process structure of the software products 210 (which software components 220 must generally be invoked along a hierarchical path).

At the end, another implementation defines the relationships according to an access to a predefined memory structure (such as a file or a database); in this case, the software components 220 are considered included in the corresponding group 230 when they use the same memory structure (for example, writing and reading it as producers/consumers). The proposed choice reflects the data sharing properties of the software products 210 (which software components 220 must generally process common data relevant to the specific application).

In the above-described algorithm, an available software component 220 might be included in two or more (eligible) valid groups 230; in this situation, it is not possible to assign the available software component 220 to a single group 230. In order to solve this ambiguity, a score SC is calculated for each associated software product 210 (eligible to have this ambiguous software component 220 assigned thereto); the score is indicative of the probability that the ambiguous software component 220 is actually owned by the respective software product 210.

For this purpose, a weight Wre is defined for the software components 220 that are required and exclusive, whereas another weight Wrs is defined for the software components 220 that are required but shared; likewise, a weight Woe is defined for the software components 220 that are optional and exclusive, whereas another weight Wos is defined for the software components 220 that are optional but shared. Denoting with Nre, Nrs, Noe and Nos the number of all the available software components 220 of the software product 210 included in its valid groups 230 that are required-exclusive, required-shared, optional-exclusive and optional-shared, respectively, the score SC is given by the following formula:

$$SC=Nre \cdot Wre+Nrs \cdot Wrs+Noe \cdot Woe+Nos \cdot Wos.$$

The software product 210 with the highest score SC is selected; the ambiguous software component 220 is then assigned to this selected software product 210, and then to the corresponding eligible group(s) 230.

As a result, all the available software components 220 are assigned to a single software product 210 (either deterministically or at least with an acceptable degree of confidence).

Preferably, the weights Wre, Wrs, Woe and Wos have decreasing values (for example, Wre=$2^3$=8, Wrs=$2^2$=4, Woe=$2^1$=2 and Wos=$2^0$=1). This choice reflects the fact that the availability of the software components 220 that are required-exclusive, required-shared, optional-exclusive and optional-shared has a decreasing relevance for indicating that the software product 210 is actually available on the execution server.

Figure 3:
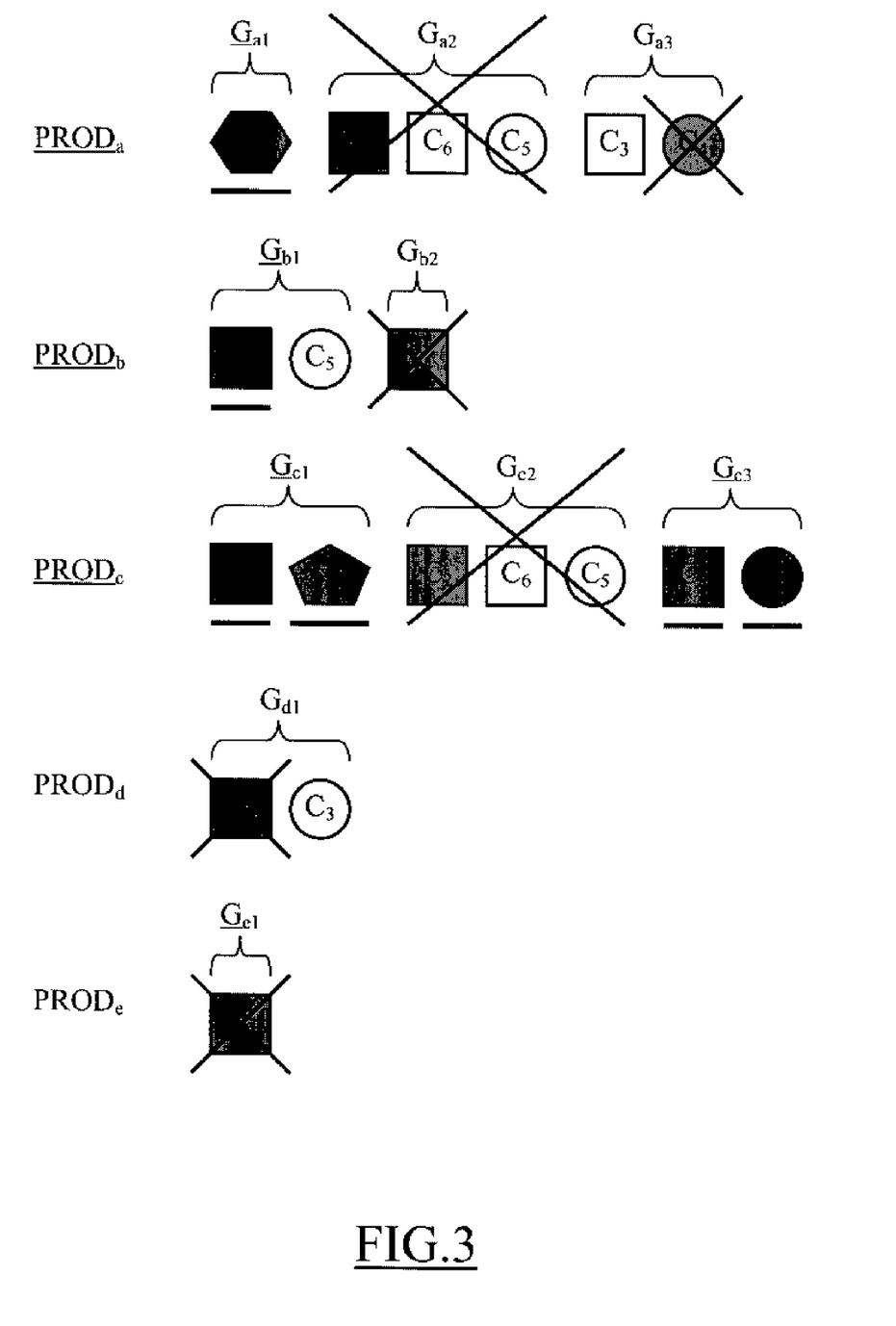
FIG. 3 illustrates an exemplary application of the solution according to an embodiment of the invention.

Moving now to FIG. 3, in order to explain an exemplary application of the above-described technique reference will be made to five software products $PROD_a$-$PROD_e$, which may include nine software components $C_1$-$C_9$. The software products $PROD_a$, $PROD_b$, $PROD_c$, $PROD_d$ and $PROD_e$ are defined by corresponding groups $G_{a1}$-$G_{a3}$, $G_{b1}$-$G_{b2}$, $G_{c1}$-$G_{c3}$, $G_{d1}$ and $G_{e1}$, respectively (all of them being based on the same relationship); each group $G_{a1}$-$G_{e1}$ includes one or more of the above mentioned software components $C_1$-$C_9$, which may be required-exclusive (represented with an hexagon, as for the software component $C_1$ in the group $G_{a1}$), required-shared (represented with a square, as for the software component $C_2$ in the group $G_{a2}$), optional-exclusive (represented with a pentagon, as for the software component $C_7$ in the group $G_{c1}$) or optional-shared (represented with a circle, as for the software component $C_5$ in the group $G_{c2}$).

Let us assume now that the software components available on the execution server that are linked by the relationship defining the groups $G_{a1}$-$G_{e1}$ are $C_1$, $C_2$, $C_4$, $C_7$, $C_8$ and $C_9$. In this condition, all the groups $G_{a1}$-$G_{e1}$ may include some of the available software components $C_1$-$C_9$ (being shaded in the figure).

The valid groups having all the required software components (either exclusive or shared) available on the execution server are then determined; in this case, the only non-valid groups—crossed in the figure—are $G_{a2}$ and $G_{c2}$ (since the required software component $C_6$ is missing in both of them). The process continues by verifying whether some available software component is included in a single valid group; in this case, the available software component is automatically assigned to the corresponding valid group (as indicated by underlying it in the figure). Of course, the condition is always satisfied by the exclusive software components (either required or optional), which can be included in a single group by definition. In the example at issue, the available software component $C_1$ is assigned to the valid group $G_{a1}$ and the available software component $C_7$ is assigned to the valid group $G_{c1}$; moreover, the same condition is also satisfied by the available software component $C_2$, which is assigned to the valid group $G_{b1}$.

The other (ambiguous) software components $C_4$, $C_8$ and $C_9$ are instead included in multiple (eligible) groups, i.e., the ambiguous software component $C_4$ in the eligible groups $G_{a3}$, $G_{b2}$ and $G_{c1}$, the ambiguous software component $C_8$ in the eligible groups $G_{c3}$ and $G_{d1}$, and the ambiguous software component $C_9$ in the eligible groups $G_{c3}$ and $G_{e1}$. Therefore, for each (eligible) software product ($PROD_a$-$PROD_e$) including one or more of those eligible groups the corresponding scores are calculated (denoted by adding the same index to the term SC):

$$SC_a=Nre \cdot Wre+Nrs \cdot Wrs+Noe \cdot Woe+Nos \cdot Wos= 1 \cdot 8+0 \cdot 4+0 \cdot 2+1 \cdot 1=8+1=9,$$

$$SC_b=Nre \cdot Wre+Nrs \cdot Wrs+Noe \cdot Woe+Nos \cdot Wos=0 \cdot 8+ 2 \cdot 4+0 \cdot 2+0 \cdot 1=8,$$

$$SC_c=Nre \cdot Wre+Nrs \cdot Wrs+Noe \cdot Woe+Nos \cdot Wos=0 \cdot 8+2 \cdot 4+ 1 \cdot 2+1 \cdot 1=8+2+1=11,$$

$$SC_d=Nre \cdot Wre+Nrs \cdot Wrs+Noe \cdot Woe+Nos \cdot Wos=0 \cdot 8+1 \cdot 4+ 0 \cdot 2+0 \cdot 1=4 \text{ and}$$

$$SC_e=Nre \cdot Wre+Nrs \cdot Wrs+Noe \cdot Woe+Nos \cdot Wos=0 \cdot 8+1 \cdot 4+ 0 \cdot 2+0 \cdot 1=4.$$

In this condition, the ambiguous software component $C_4$ is assigned to the eligible group $G_{c1}$ (since the score $SC_c$=11 is higher than the scores $SC_a$=9 and $SC_b$=8); this is indicated in the figure by underlying the software component $C_4$ in the selected group $G_{c1}$, and at the same time crossing the available software component $C_4$ in the other (non-selected) eligible groups $G_{a3}$ and $G_{b2}$. Likewise, the ambiguous software component $C_8$ is assigned to the eligible group $G_{c3}$ (since the score $SC_c$=11 is higher than the scores $SC_d$=4), and the ambiguous software component $C_9$ is again assigned to the eligible group $G_{c3}$ (since the score $SC_c$=11 is higher than the scores $SC_e$=4).

As a result, the groups $G_{a1}$, $G_{b1}$, $G_{c1}$ and $G_{c3}$ (underlined in the figure) are considered available on the execution server, since all the corresponding (exclusive or shared) required software products $C_1$, $C_2$, $C_4$ and $C_8$, respectively, are available. It is then possible to identify the software products $PROD_a$, $PROD_b$ and $PROD_c$ (underlined in the figure) as available on the execution server, since at least one of the corresponding groups $G_{a1}$, $G_{b1}$ and $G_{c1}$-$G_{c3}$, respectively, are available.

Figure 4:
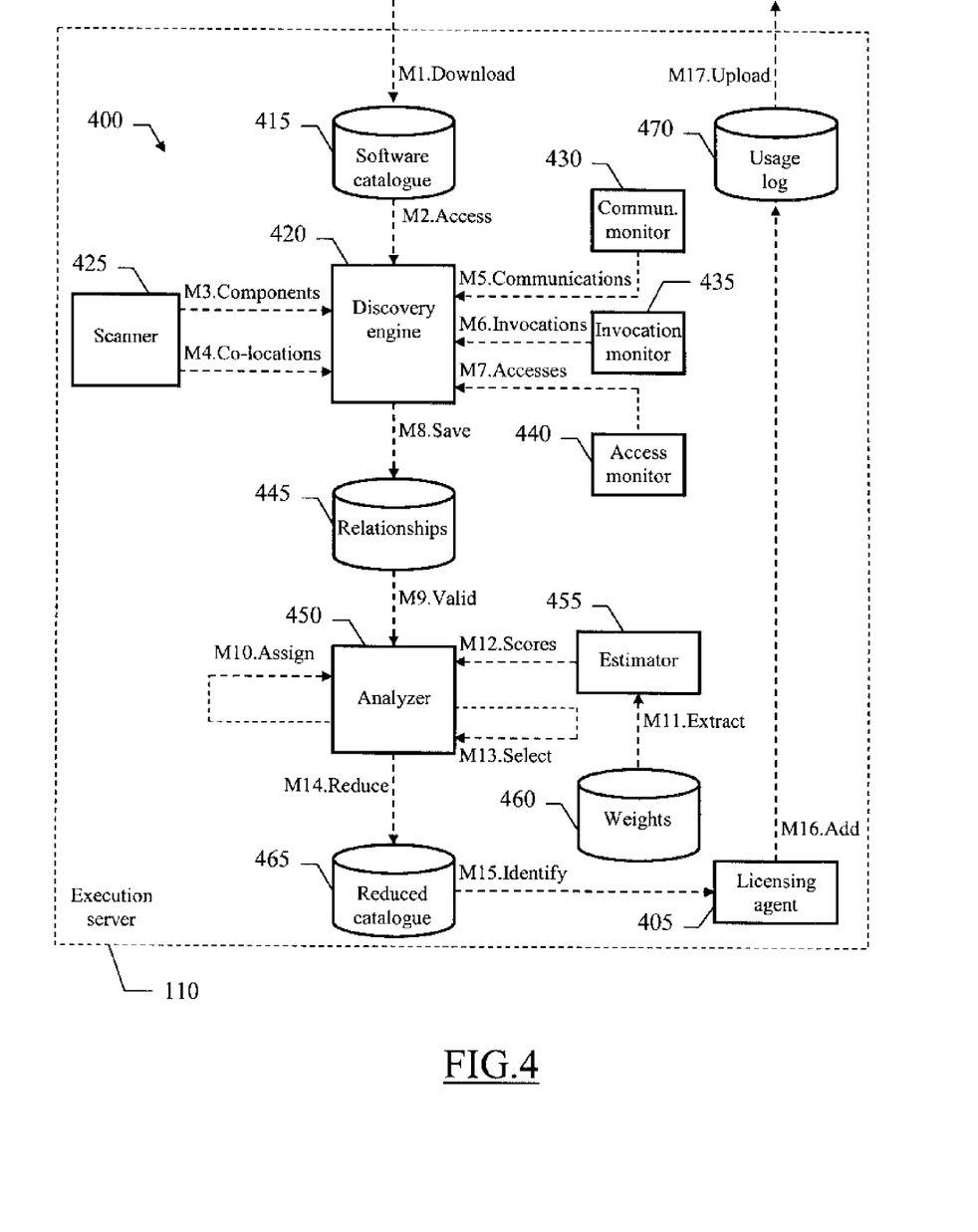
FIG. 4 is a collaboration diagram representing the roles of different software modules implementing the solution according to an embodiment of the invention.

With reference to FIG. 4, the main software modules that may be used on a generic execution server 110 to implement the above-described solution are denoted as a whole with the reference 400. The information (programs and data) is typically stored on the hard-disk and loaded (at least partially) into the working memory of the execution server 110 when the programs are running. The programs are initially installed onto the hard disk, for example, from CD-ROM. Particularly, the figure describes the static structure of the system (by means of the corresponding modules) and its dynamic behavior (by means of a series of exchanged messages that are denoted with progressive sequence numbers preceded by the symbol "M").

In detail, a licensing agent 405 (continually running in the background) detects the usage of software components/products installed on the execution server 110. The process is based on the content of a local copy of a software catalogue 415 that is downloaded from the associated runtime server, not shown in the figure (action "M1.Download"). The software catalogue 415 specifies all the known software products to be metered in the organization. More specifically, each software product is identified by a composition signature. The composition signature specifies the groups (in logical OR) indicating the availability of the software product on the execution server. Each group is defined by the relationship that must link the corresponding software components (i.e., co-location, inter-communication, invocation dependency or access to memory structure); each software component is also flagged as required or optional, and as exclusive or shared. Each software component is in turn identified by an installation signature, which indicates the installation of the software component on the execution server. The installation signature may consist of the indication of a file (generally defined by multiple attributes, such as its name, size and checksum) or of a configuration parameter; a more complex example is an extended signature, which consists of an expression based on multiple conditions in logical AND (such as of the above-mentioned type). In any case, each installation signature uniquely identifies a single software component as available on the execution server. In addition, each software component is also identified by a usage signature, which indicates the running of the software component on the execution server. The usage signature may consist of an expression based on the loading of one or more executable modules in logical OR (generally simply defined by their names). Another example is an instrumentation signature, which consists of a message returned by the software component itself (specifically adapted for this purpose). It should be noted that each usage signature may identify multiple software components (such as different versions or service levels thereof).

The software catalogue 415 is accessed by a discovery engine 420 (action "M2.Access"), such as the above-mentioned "CIT". The discovery engine 420 interacts with a scanner 425. The module 425 scans a file system of the execution server 110 and then identifies all the software components that are available according to the corresponding installation signatures (action "M3.Components"). In this phase, the scanner 425 also determines the available software components that are linked by any required co-location relationship (action "M4.Co-locations"). The discovery engine 420 further interacts with a communication monitor 430, an invocation monitor 435 and an access monitor 440. The communication monitor 430 intercepts all the local and/or remote messages exchanged among the available software components, so as to determine the available software components that are linked by any communication relationship (action "M5.Communications"). The invocation monitor 435 instead intercepts the launching of any new process on the execution server 110; this information is used to determine the corresponding available software components that are linked by any invocation relationship (action "M6.Invocations"). At the end, the access monitor 440 intercepts all the read/write operations on any memory structure of interest, so as to determine the available software components that are linked by the corresponding access relationship (action "M7.Accesses").

The discovery engine 420 saves an indication of the software components that are available in the execution server 110 and their relationships into a corresponding repository 445 (action "M8.Save"). An analyzer 450 determines all the groups (indicated in the software catalogue 415) that are valid, i.e., having all the required software components available as indicated in the relationship repository 445 (action "M9.Valid"). The analyzer 450 then assigns each available software component included in a single valid group to this group (action "M10.Assign").

The analyzer 450 interfaces with an estimator 455. The estimator 455 extracts the weights assigned to the different types of software components, i.e., required-exclusive, required-shared, optional-exclusive and optional-shared, from a corresponding table 460 (Action "M11.Extract"). The estimator 455 then calculates the score of each eligible software product, which is associated with one or more of the eligible groups relating to the remaining ambiguous software components, i.e., included in multiple eligible groups (action "M12.Scores"). For each one of these ambiguous software components, in response thereto the analyzer 445 selects the valid group (or groups) corresponding to the software product with the highest score, to which the ambiguous software product is then assigned (action "M13.Select").

The analyzer 450 now extracts a reduced catalogue 465 from the software catalogue 415 (action "M14.Reduce"). The reduced catalogue 465 lists the software components that are available on the execution server 110, each one identified by the corresponding usage signature only; for each available software component, the reduced catalogue 465 also specifies the corresponding software product owning it (as resulting from the above-described discovery process).

Periodically (for example, every 1-10 minutes), the licensing agent 405 retrieves a list of processes that are active on the execution server 110 (by means of a corresponding API of its operating system). For each process, the licensing agent 405 verifies whether the name of the corresponding executable module is included in the reduced catalogue 465; when the executable module matches an entry of the reduced catalogue 465, the corresponding software component (with its software product) is identified as running on the execution server 110 (action "M15.Identify"). The list of running software components so obtained is compared with the content of a runtime table, which provides a snapshot of the software components running on the execution server 110 at a previously iteration of the process; in this way, it is possible to detect the software components that have been started or stopped since then. Each detected event with a corresponding time-stamp is added to a usage log 470, with the runtime table that is updated accordingly (action "M16.Add"). With a different periodicity (for example, at the end of every day), the licensing agent 405 uploads the usage log 470 to the associated runtime server (action "M17.Upload").

The runtime server receives the usage logs from every execution server in the division, and forwards it to the administration server; moreover, the runtime server downloads a main copy of the software catalogue and distributes it to the corresponding execution servers (for example, periodically or at any change thereof). The administration server in turn aggregates the received information into a usage report, which lists all the periods of usage of the software components/products on different numbers of execution servers (for example, during the last day); this information may be used to charge a prescribed licensing fee for any usage peak of the known software components/products (based on predefined rates varying according to the actual use of the software components in the different software products).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

Particularly, similar considerations apply if the system has a different architecture or includes equivalent units. For example, the execution servers (down to a single one) may be associated with a single runtime server (which receives and processes the information at the same time); in any case, nothing prevents the application of the proposed solution to a stand-alone computer. Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

The proposed solution may also be used to discover whatever software products (such as electronic books or multimedia works); likewise, the software products may include any equivalent software components (such as monitors or databases). More generally, the proposed solution is suitable to be applied to any digitally encoded manufacture and parts thereof. In any case, the same algorithm may be used in alternative scenarios; for example, the devised solution also finds application to discover simple software products (including exclusive software components only) in addition to the above-mentioned complex software products (including shared software components).

It should be readily apparent that the exploitation of the present invention is not limited to any specific license management application; particularly, the available information may be simply used to meter the usage of software products (as identified by the availability of the corresponding software components), or more generally for whatever management purpose. In any case, the solution according to the present invention lends itself to be used in different environments (such as for monitoring applications).

Without departing from the principles of the invention, the available software components may be detected by means of different installation signatures (or by any other equivalent technique). It is also emphasized that the software catalogue does not necessarily consist of a single file; alternatively, it is possible to provide multiple files for the different types of signatures, or more generally any other similar structure.

It should be readily apparent that the relationships described above (with the corresponding methods for their detection) are not comprehensive. For example, it is possible to define any other relationship (such as requiring a common version of the software components), or to combine them into complex expressions; conversely, only some of the proposed relationships may be supported (down to a single one for all the groups).

Alternatively, it is also possible to identify the valid groups according to different criteria (for example, in response to the availability of a predetermined percentage of their software components).

Moreover, nothing prevents implementing alternative algorithms for assigning the available software components to the corresponding software products; for example, it is possible to associate each available software component to all the eligible software products (when the available software component may be used by more software products at the same time). Alternatively, the scores may be used only as a suggestion for a system administrator (who always takes the final decision); in any case, this feature is not strictly necessary and it may be omitted in a basic implementation of the invention (only assigning the software components to the corresponding software products deterministically, when it is possible).

A simplified implementation of the proposed solution (wherein the groups are defined only according to the required software components) is also within the scope of the invention.

Naturally, different weights may be used to calculate the scores of the software products; moreover, it is also possible to combine the weights in a different way (for example, according to a logarithmic scale), or even to base the corresponding formula on some types of software components only. In any case, the use of other algorithms to select the eligible groups for the assignment of any ambiguous software component is not excluded (for example, based on fuzzy logic techniques).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for discovering software components belonging to software products in a data processing system, at least one of the software components being suitable to belong to a plurality of software products, wherein the method comprises:

associating each software product with the definition of at least one group of software components based on a relationship among the software components of the group, detecting the software components available in the data processing system being included in each group, identifying the groups being valid according to the inclusion of the software components of the corresponding definition, and assigning each available software component to at least one of the plurality of software products having at least one associated valid group including the available software component, wherein assigning each available software component to at least one of the plurality of software products comprises:

calculating a score of each software product according to available software components included in the at least one associated valid group, and selecting an eligible software product having a best score, and wherein calculating the score of each software product comprises:

combining a first number, a second number, a third number and a fourth number of the available software components included in the associated valid groups, wherein the associated valid groups being required and exclusive, required and shared, optional and exclusive, and optional and shared, respectively, according to a corresponding first weight, second weight, third weight and fourth weight, respectively.

2. The method according to claim 1, wherein the relationship defining at least one of the groups comprises a co-location of the corresponding software components in a common logical environment, and wherein detecting the software components available in the data processing system being included in each group, for each logical environment available in the data processing system, comprises:

scanning the available logical environment to determine the available software components belonging thereto.

3. The method according to claim 1, wherein the relationship defining at least one of the groups comprises an intercommunication of the corresponding software components, and wherein detecting the software components available in the data processing system being included in each group comprises:

monitoring the intercommunications of the available software components.

4. The method according to claim 1, wherein the relationship defining at least one of the groups comprises an invocation dependency of the corresponding software components, and wherein detecting the software components available in the data processing system being included in each group comprises:

monitoring the invocations of the available software components.

5. The method according to claim 1, wherein the relationship defining at least one of the groups comprises an access to a predefined memory structure by the corresponding software components, and wherein detecting the software components available in the data processing system being included in each group comprises:

monitoring the accesses of the available software components to the predefined memory structure.

6. The method according to claim 1, wherein assigning each available software component to at least one of the plurality of software products comprises:

assigning each available software component included in a valid group associated with a single software product to the single software product, and assigning each available software component included in a plurality of eligible ones of the valid groups associated with a plurality of eligible ones of the software products to a selected one of the eligible software products by:

calculating a score of each eligible software product according to the available software components included in the associated valid groups, and selecting the eligible software product having the best score.

7. The method according to claim 1, wherein, for each group for which each corresponding software component is required, when necessary to define the group or optional otherwise, identifying the groups being valid according to the inclusion of the software components of the corresponding definition comprises:

identifying the groups being valid in response to the availability of all the corresponding software components being required.

8. The method according to claim 7, wherein each software component is shared by a plurality of software products.

9. A computer program product stored in a non-transitory computer readable medium for discovering software components belonging to software products in a data processing system, which is capable of executing a method on a data processing system at least one of the software components being suitable to belong to a plurality of software products, wherein the method comprises:

associating each software product with the definition of at least one group of software components based on a relationship among the software components of the group, detecting the software components available in the data processing system being included in each group, identifying the groups being valid according to the inclusion of the software components of the corresponding definition, and assigning each available software component to at least one of the plurality of software products having at least one associated valid group including the available software component, wherein assigning each available software component to at least one of the plurality of software products comprises:

calculating a score of each software product according to available software components included in the at least one associated valid group, and selecting an eligible software product having a best score, and wherein calculating the score of each software product comprises:

combining a first number, a second number, a third number and a fourth number of the available software components included in the associated valid groups, wherein the associated valid groups being required and exclusive, required and shared, optional and exclusive, and optional and shared, respectively, according to a corresponding first weight, second weight, third weight and fourth weight, respectively.

10. The computer program product according to claim 9, wherein the relationship defining at least one of the groups comprises an invocation dependency of the corresponding software components, and wherein detecting the software components available in the data processing system being included in each group comprises:

monitoring the invocations of the available software components.

11. The computer program product according to claim 9, wherein the relationship defining at least one of the groups comprises an access to a predefined memory structure by the corresponding software components, and wherein detecting the software components available in the data processing system being included in each group comprises:

monitoring the accesses of the available software components to the predefined memory structure.

12. The computer program product according to claim 9, wherein assigning each available software component to at least one of the plurality of software products comprises:

assigning each available software component included in a valid group associated with a single software product to the single software product, and assigning each available software component included in a plurality of eligible ones of the valid groups associated with a plurality of eligible ones of the software products to a selected one of the eligible software products by:

calculating a score of each eligible software product according to the available software components included in the associated valid groups, and selecting the eligible software product having the best score.

13. The computer program product according to claim 9, wherein each software component is shared by a plurality of software products.

14. The computer program product according to claim 9, wherein the relationship defining at least one of the groups comprises a co-location of the corresponding software components in a common logical environment, and wherein detecting the software components available in the data processing system being included in each group, for each logical environment available in the data processing system, comprises:

scanning the available logical environment to determine the available software components belonging thereto.

15. A discovering system for discovering software components belonging to software products in a data processing system, at least one of the software components being suitable to belong to a plurality of software products, wherein the discovering system includes:

a microprocessor, a memory, a software catalogue for associating each software product with the definition of at least one group of software components based on a relationship among the software components of the group, an engine for detecting the software components available in the data processing system being included in each group, an analyzer for identifying the groups being valid according to the inclusion of the software components of the corresponding definition, and an agent for assigning each available software component to at least one of the plurality of software products having at least one associated valid group including the available software component, wherein the agent assigns each available software component to at least one of the plurality of software products by:

calculating a score of each software product according to available software components included in the at least one associated valid group, and selecting an eligible software product having a best score, and wherein calculating the score of each software product comprises:

combining a first number, a second number, a third number and a fourth number of the available software components included in the associated valid groups, wherein the associated valid groups being required and exclusive, required and shared, optional and exclusive, and optional and shared, respectively, according to a corresponding first weight, second weight, third weight and fourth weight, respectively.

16. The discovering system according to claim 15, wherein the relationship defining at least one of the groups comprises a co-location of the corresponding software components in a common logical environment, and wherein the engine for detecting the software components available in the data processing system being included in each group, for each logical environment available in the data processing system, comprises:

means for scanning the available logical environment to determine the available software components belonging thereto.

17. The discovering system according to claim 15, wherein the relationship defining at least one of the groups comprises an intercommunication of the corresponding software components, and wherein the engine for detecting the software components available in the data processing system being included in each group comprises:

means for monitoring the intercommunications of the available software components.

18. The discovering system according to claim 15, wherein the relationship defining at least one of the groups comprises an invocation dependency of the corresponding software components, and wherein the engine for detecting the software components available in the data processing system being included in each group comprises:

means for monitoring the invocations of the available software components.

19. The discovering system according to claim 15, wherein the agent comprises:

means for assigning each available software component included in a valid group associated with a single software product to the single software product, means for assigning each available software component included in a plurality of eligible ones of the valid groups associated with a plurality of eligible ones of the software products to a selected one of the eligible software products, means for calculating a score of each eligible software product according to the available software components included in the associated valid groups, and means for selecting the eligible software product having the best score.

20. The discovering system according to claim 15, wherein, for each group for which each corresponding software component is required, when necessary to define the group or optional otherwise, the analyzer comprises:

means for identifying the groups being valid in response to the availability of all the corresponding software components being required.

* * * * *